Nov. 30, 1937.　　　　　　F. NELL　　　　　　2,100,448
COLLAPSIBLE TAP
Filed Feb. 5, 1935　　　　　　2 Sheets-Sheet 1
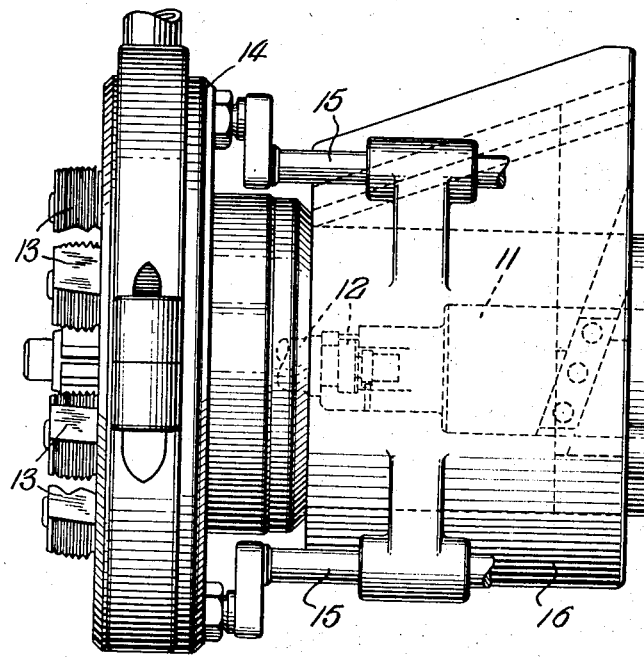
Fig. 1.
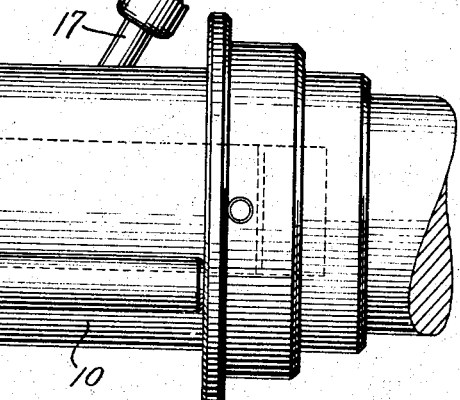
Fig. 2.
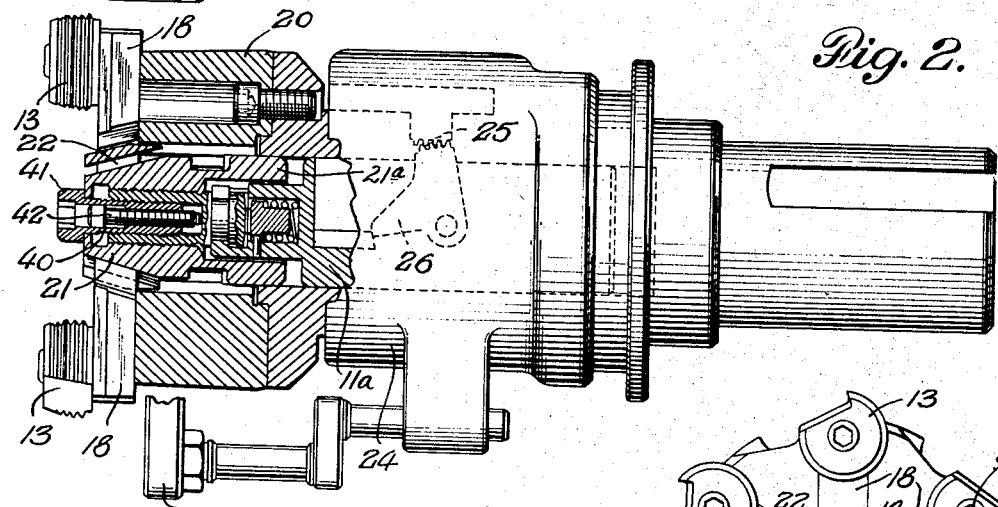
Fig. 3.
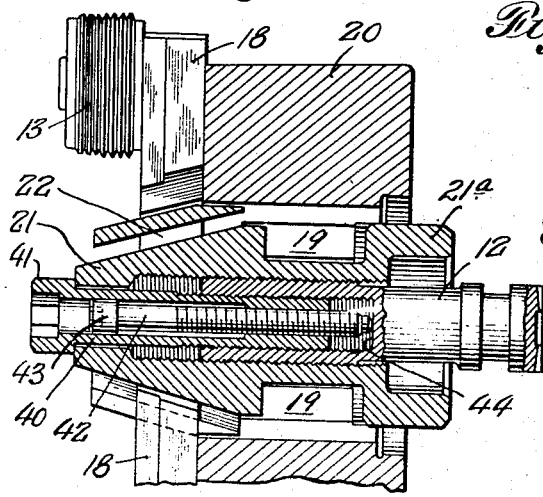
Fig. 4.
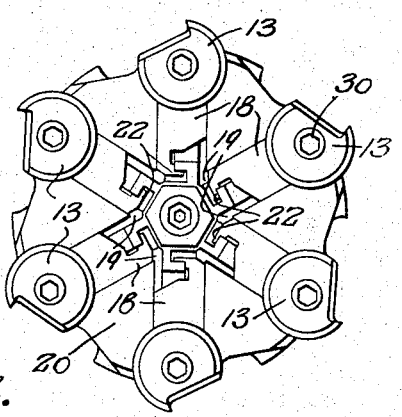
INVENTOR.
Frederic Nell
BY
Hjalmar Dowell
ATTORNEY.

Nov. 30, 1937.　　　　　　F. NELL　　　　　　2,100,448
COLLAPSIBLE TAP
Filed Feb. 5, 1935　　　　　　2 Sheets-Sheet 2

INVENTOR.
Frederic Nell
BY
ATTORNEY.

Patented Nov. 30, 1937

2,100,448

UNITED STATES PATENT OFFICE 2,100,448

COLLAPSIBLE TAP

Frederic Nell, Waynesboro, Pa., assignor to Landis Machine Company, Waynesboro, Pa., a corporation of Pennsylvania Application February 5, 1935, Serial No. 5,129

11 Claims. (Cl. 10—145)

My invention relates to receding collapsible taps such as are used for threading tubes, couplings, pipes, valve bodies or work pieces of any character.

The present invention is concerned with the tapping head or thread cutting elements for a tap such as that disclosed in U. S. Letters Patent No. 1,811,802, issued June 23, 1931 to Samuel F. Newman or that disclosed in my copending application Serial No. 710,171, filed January 29, 1934, which issued January 14, 1936, as Patent No. 2,028,075.

It is an object of my invention to provide a screw thread cutting device having circular chasers mounted in an improved manner on slides or holders.

Another object of my invention is to provide improved means for adjusting the cutting edge of a circular chaser about its own axis.

Another object of my invention is to provide a collapsible tap having circular chasers supported in a manner to obviate breakage of the chasers or the holders therefor in case the chasers are subjected to undue stresses or strains greater than those imposed by ordinary threading operations.

A still further object of the invention is to provide improved means for supporting the chasers or slides in a manner to permit their removal and replacement for sharpening or other desired reason without affecting the original cutting size.

Other objects and advantages of the invention will become apparent as the description proceeds.

A preferred construction embodying the invention is illustrated on the accompanying drawings which are made a part hereof and in which—

Figure 8:
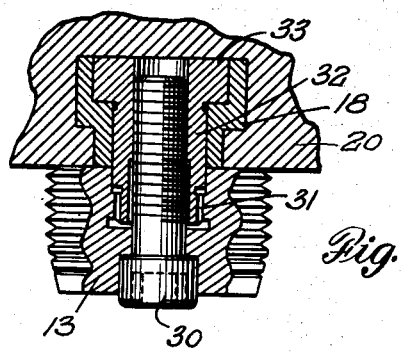
Figure 6:
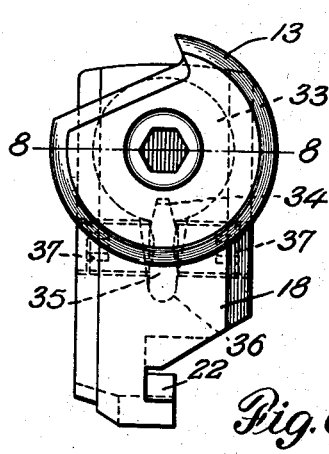
Figure 7:
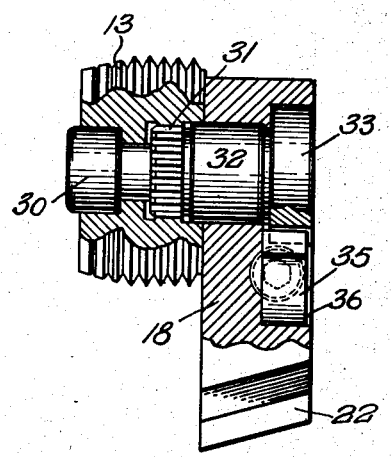
Figure 5:
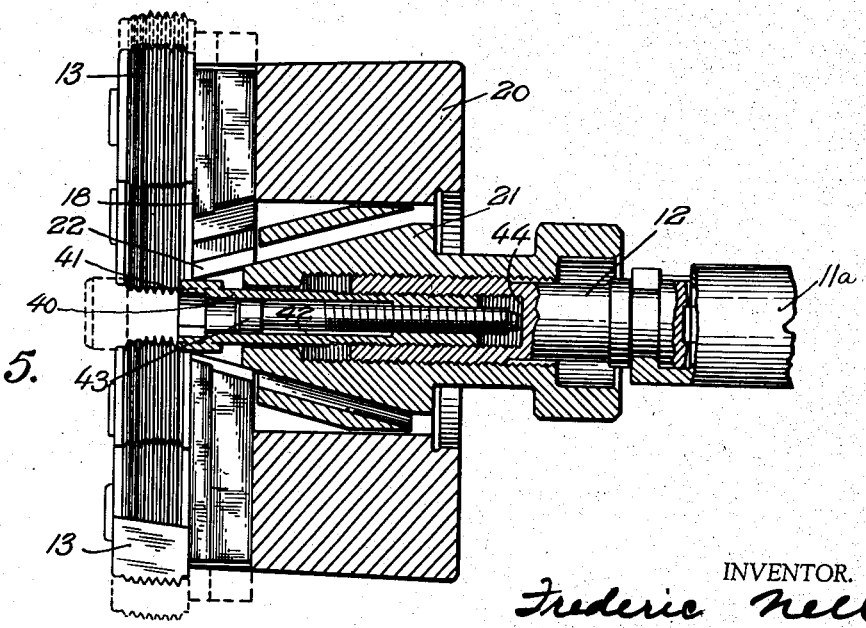

Fig. 1 is a side elevation showing the improved tap head applied to a tap body and component parts of the general character disclosed in the above-mentioned Patent #1,811,802;

Fig. 2, a side elevation of the improved construction applied to a tap body and component parts of the general character illustrated in said Patent No. 2,028,075;

Fig. 3, a face view of the tapping head with the chasers in position for threading;

Fig. 4, a view partially in section of the tapping head with the chaser holders or slides and chasers in position for threading;

Fig. 5, a similar view partially in section with the plunger in a position to permit removal of the slides in the head;

Fig. 6, a face view of one of the circular chasers mounted on a slide or holder;

Fig. 7, a side view of the same with portions of the chaser and slide cut away;

Fig. 8, a sectional view taken on the line 8—8 of Fig. 6, and

Figure 9:
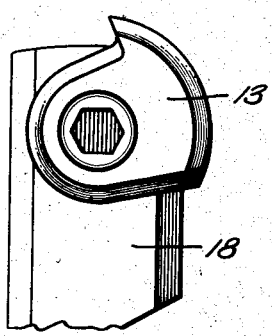

Fig. 9, a face view of a chaser and slide after the chaser has been sharpened a number of times.

Referring to Fig. 1, the improved tapping head is shown mounted upon a tap body and shank similar to that disclosed in the patent to Newman No. 1,811,802. The tap body comprises a body portion 10 containing a reciprocable plunger member 11 engaging the end of a rod 12 adapted to move or control the chasers 13 and to collapse the same after the threading operation in the manner set forth in said patent. The movement of the plunger 11 and rod 12 is controlled by the work engaging ring member 14 slidably supported upon the rods 15 and sleeve 16 on the tap body as is well understood by those skilled in the art. The resetting of the chasers after the threading operation, is accomplished by the re-setting handle 17 adapted to engage the reciprocable plunger 11 in the usual manner. The present application is not concerned with the tap body or with the rearward mechanism for receding or collapsing the chasers but only with the construction and support of the chasers and head and with the arrangement for removably securing the same in the head of the tap.

The invention may likewise be incorporated in other types of collapsing taps as will be apparent. Thus in Fig. 2 is shown the application of the improved chasers and supporting means therefor to a tap body of the character shown in my copending application Ser. No. 710,171. In this case, as in the illustration described above, the circular chasers 13 are mounted on slides or holders 18 which are radially movable in the tap head 20.

The positions of the chaser holders 18 are controlled by the cam member 21 which is reciprocable in the tap body 20 and is provided with integral cam wings or tongues affording angular slots to receive the ends 22 of the chaser slides as shown more clearly in Fig. 3. A ring 23 adapted to engage the work is supported upon a reciprocable sleeve 24 having a rack 25 arranged to engage and control the latch member 26 adapted to release the cam member 21 and collapse the chasers at the end of the threading operation as clearly described in said copending application. Since the present invention relates primarily to the construction and mounting of the chasers 13 and the means for securing the same in position in the tap body 20, no detailed description of the tap body is deemed necessary. Suitable constructions of taps arranged to cause the chasers to collapse or recede at a predetermined point are well-known and the present invention may be applied to these or other constructions.

Referring more particularly to Figs. 3 and 6-9, it will be noted that the chasers 13 are of the circular type and provided with peripheral cutting edges corresponding to the threads to be cut. Each chaser is mounted on the outer side of chaser slide or holder 18 and located diametrically by bushing 32 which extends through slide 18 with a plain or piloting section. Bushing 32 having an enlarged end portion 33 is interposed between slide and the chaser and is provided with uniformly spaced sockets to receive the splines 31 of the chaser. In this manner the chaser may be mounted upon the bushing and slide in any of a plurality of closely spaced angular positions in order to present the cutting edges of the chaser in the proper relationship to the work and is securely clamped with screw 30 which is screwed into the central bore of bushing 32. The sharpening of the chaser necessarily changes the position of the cutting edges but, as shown in Fig. 9, the chaser may be used after repeated sharpening by turning the same upon the holder 18.

In order to effect a precise adjustment of the cutting edges of the chaser with respect to the slide, the enlarged end 33 of the bushing 32 is provided with a notch 34 to receive a gear tooth or finger 35 which is mounted in a socket 36 in the slide 18. The finger 35 is clamped between two opposing screws 37 threaded into the slide 18 and adapted to engage the opposite sides of said finger and lock the same in adjusted position. The ends of said screws may be provided with sockets to receive an adjusting wrench, as shown in Fig. 7. It will be apparent that by loosening one of the screws 37 and tightening the opposite screw, the finger 35 may be rocked to turn the chaser 13 and bushing 32 upon the slide 18 and thereby adjust the cutting edges of the chaser.

Preferably the splines 31 in the chaser are so spaced that the rotative adjustment of the chaser 13 by means of the finger 35 may be greater than that secured by advancing the chaser on the bushing 32 by one spline. In this manner an accurate adjustment of the cutting edge of the chaser 13 is always possible. The bushing 32 is free to rotate in the slide 18 when the clamping screw 30 is loosened, except for its engagement with the finger 35, and is tightly held when the clamping screw 30 is tightened.

Heretofore circular chasers have been used in which the chaser is held against rotation by serrations upon the chaser and holder. In such constructions when the chasers were subjected to abnormal stresses beyond the usual thread cutting requirements, the serrations in the chaser and holder were sheared off and either the chaser or the holder or both were badly damaged so that they could not be repaired. In the construction shown, the finger 35 has less shearing strength than the splines on the chaser so that if the tap is subjected to abnormal stresses, said finger will be sheared off without damage to the chaser or holder. This construction has the advantage that the tap may be readily repaired or the finger 35 replaced thus saving the expense of replacing the chaser or slide.

Referring to Figs. 3 and 5, it will be seen that the plunger 21 having hooked engagement with the ends 22 of the chaser slide effects radial inward or outward movement of the slides to produce a tapered thread or a collapsing of the thread-cutting elements or chasers. It is of the utmost importance to provide means to locate definitely the radial position of the thread cutting elements at the beginning of the threading operation to insure the proper diameter of thread being cut; and also to provide a construction in which the chasers may be removed or sharpened and then replaced without changing the diameter of the thread to be cut so that no further measurement or re-adjustment is required after sharpening the chasers. In the construction shown this result is obtained by the manner in which the cam member 21 is mounted on and attached to the reciprocable rod 12.

The member 21 is internally threaded to receive the threaded rod 12 which is free to rotate upon the plunger 11a but is held against longitudinal movement with respect to said plunger. A threaded sleeve 40 provided with an enlarged head 41 adapted to engage the end of the plunger 21 is threaded into the forward end of the rod 12. The head 41 of the sleeve 40 may be provided with a socket to receive a wrench as shown. The sleeve 40 is further provided with internal screw threads for engagement with the locking screw 42 having the head 43 provided with a socket to receive a wrench and adapted to abut at the rear end thereof against the end 44 of the recess in the rod 12. The screw 42 when tightened is adapted to clamp the sleeve 40 rigidly to the rod 12.

To adjust the tap for size the plunger 21 is moved until the thread diameter of chasers 13 is that desired. This is accomplished by turning rod 12 which can be rotated in relation to plunger member 11a. This rotation of rod 12 is done by means of threaded sleeve 40 which is secured to rod 12 by means of locking screw 42 whereby rod 12, sleeve 40 and locking screw 42 turn as one piece. When the thread diameter of chasers 13 is that desired head 41 of sleeve 40 abuts end plunger 21.

In order to remove chasers for sharpening the member 12 is turned by means of sleeve 40 until plunger 21 has been moved rearwardly (see Fig. 5) disengaging the tongue 22 of slide 18 from angular slots of plunger 21. The slides 18 can now be withdrawn from the head. After sharpening the chasers and adjusting the cutting edges thereof in proper relation to the slides 18 by means of the screws 37 and the adjusting finger 35 the chaser slides are replaced in the head and upon turning the member 12 by means of sleeve 40 the plunger 21 is moved forwardly until said plunger abuts head 41 of sleeve 40.

In my copending application Serial No. 117,947, filed December 28, 1936, I have claimed the feature here shown of making the nose of the cam 21 extend slightly forwardly of the cam wings which interlock with the ends 22 of the chaser slides, so as to accurately position the slides for easy pick-up by the cam when the latter is moved forwardly from its relative position illustrated in Figure 5 of the present application. This feature facilitates assembly and replacement of the chaser slides.

The chaser holders are very firmly and accurately supported in position. Their inner ends make surface contact with the illustrated inclined flat faces of the cam member 21, and the latter is very rigidly supported in all of its axial positions by the body 20, as follows. The body 20 has a series of integral, V-shaped and inwardly extending formations 19, as best seen in Figures 3 and 4, which snugly engage the cam member 21 in a series of parallel lines, each disposed between one of the inclined cam faces and an adjacent cam wing or tongue. The series of line contacts rigidly maintains the cam centrally of the head, with no possibility of radial movement; and the surface engagement of the cam wings with the sides of the V-shaped formations 19 firmly holds the cam against rotation in the head. In addition the cam has a rear end enlargement 21a of cylindrical form which snugly fits partially within a complemental recess in the rear end of the head and partially within a complemental bore in the body to which the head is attached. The chaser holders and their cutting elements thus are firmly and immovably held in position for accurate cutting. This particular construction is described in more detail and also claimed in my aforementioned copending application Serial No. 117,947.

Various modifications in the details of the construction and arrangement of the elements thereof shown and described above may occur to those skilled in the art and all such modifications are deemed to fall within the scope of the invention if within the terms of the appended claims.

I claim:—

1. In combination a tap head, radially movable chasers in said head, an operating member for moving said chasers, said operating member when in one position serving to maintain the chasers in operative relation and retractible to a position where the chasers may be removed from the head, a rod upon which said operating member is movably mounted, and a member adjustably connected with said rod with which said operating member is adapted to abut for determining the operative positions of the chasers.

2. In combination a tap head, radially movable chasers in said head, an operating member for moving said chasers, an auxiliary supporting member for said operating member, said operating member controlling the position of said chasers and movable with respect to said supporting member to a position wherein said chasers may be removed from the head, and an adjustable abutment carried by said supporting member and adapted to be engaged by said operating member for determining the normal operative relationship of the operating member to said supporting member whereby the chasers may be removed from the tap head, replaced and positioned in the same normal operative positions of the chasers.

3. A collapsible tap comprising a body portion, receding thread cutting elements thereon, a cam member for controlling said thread cutting elements and movable in said body portion to a position in which the elements may be removed for sharpening or replacement, a rod projecting into said cam member and upon which said cam member is movably mounted, means including a sleeve adjustably threaded into said rod for securing said cam member thereon, said sleeve having a portion abutting against said cam member as a limit for its movement on said rod for determining the operative positions of the chasers, and a locking screw in said sleeve adapted to engage the rod.

4. A collapsible tap comprising a body portion, receding thread cutting elements thereon, means for controlling said thread cutting elements including a cam member engaging said elements, a reciprocable member engaging said cam member, and an abutment on said reciprocable member adapted to be engaged by said cam member for normally positioning said cam member and thread cutting elements to predetermine the size of the threads cut by the tap, said cam member being movable away from said abutment to a position in which the thread cutting elements may be removed from the tap.

5. A collapsible tap comprising a body portion, receding thread cutting elements thereon, means for controlling said thread cutting elements including a cam member engaging said elements and an axially reciprocable member engaging said cam member, said cam member being threaded on said reciprocable member, a shank, said reciprocable member being rotatively secured to said shank, and an abutment for said cam member on the opposite end of the reciprocable member from the end engaging said shank.

6. A collapsible tap comprising a body portion, receding thread cutting elements thereon, means for controlling said elements comprising a cam member engaging said elements and a reciprocable member having threaded engagement with said cam member, an adjustable abutment for said cam member on said reciprocable member, and means for locking said abutment in desired position on said reciprocable member.

7. A collapsible tap comprising a body portion, receding thread cutting elements thereon, means for controlling said elements comprising a cam member engaging said elements and a reciprocable member having threaded engagement with said cam member, an adjustable abutment for said cam member having threaded engagement with said reciprocable member and a locking screw threaded into said abutment with the head end accessible from the front of the tap and adapted to engage the reciprocable member.

8. In a thread-cutting machine having slidably mounted chasers, axially shiftable control means coupled to said chasers and comprising an axially movable element and a chaser-engaging member in adjustable screw-threaded connection with said element; a device for causing relative rotation of said member and said element, said device connected by screw threads to said element to establish an adjustable stop for limiting axial movement of said member in one direction; and means for locking said device against rotation relative to said element.

9. In a thread-cutting machine having a body carrying slidably mounted chasers, an axially shiftable control means removably coupled to said chasers, said control means comprising an adjustable chaser-engaging member designed when properly positioned to establish a predetermined thread diameter, a device carried by said body and operable to position said chaser-engaging member axially, and adjustment mechanism for varying the axial relationship of said member to said device, said adjustment mechanism including means automatically operable during manipulation thereof to definitely and accurately locate said chasers upon replacement thereof after their removal for sharpening or any other purpose.

10. In the machine defined in claim 9, said adjustment mechanism comprising an externally adjustable connection between said control means and said chaser engaging member, and externally operable means for locking said connection in any selected position of adjustment.

11. In a thread-cutting machine, a body carrying slidable chasers, a device coupled to said chasers to locate them in cutting position, means for shifting said device from cutting position to a position where the chasers are collapsed but still coupled to said device, and screw-threaded means accessible to external manipulation for rotation to disengage said device from said chasers without removal of any part of the machine.

FREDERIC NELL.